March 9, 1954 E. V. ROBNETT, JR 2,671,542
SPEED CONTROL MECHANISM FOR ENGINES
Filed March 13, 1951
6 Sheets-Sheet 1

E. V. Robnett, Jr.
INVENTOR.
BY Lester B. Clark
ATTORNEY

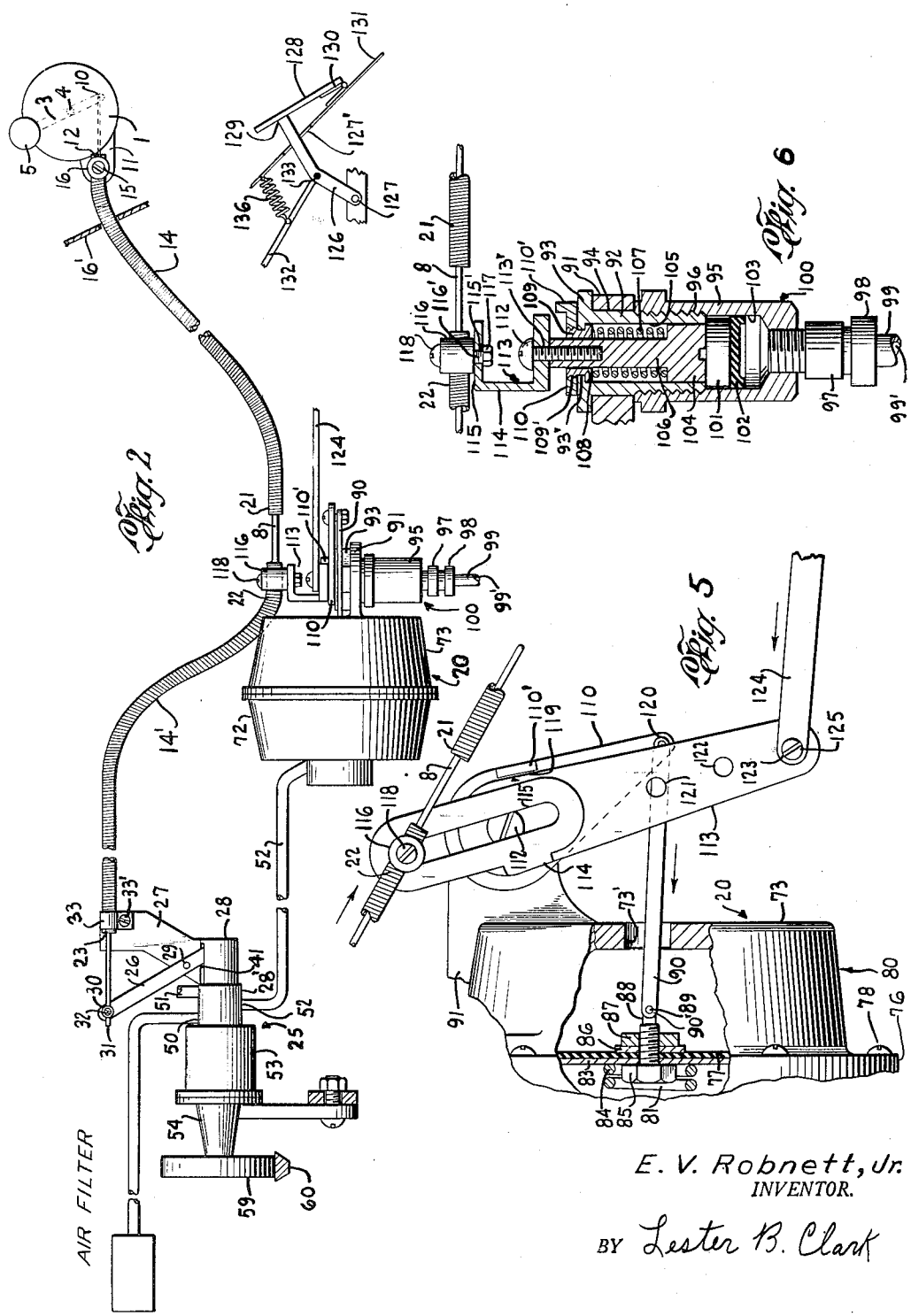

March 9, 1954 E. V. ROBNETT, JR 2,671,542
SPEED CONTROL MECHANISM FOR ENGINES
Filed March 13, 1951 6 Sheets—Sheet 3
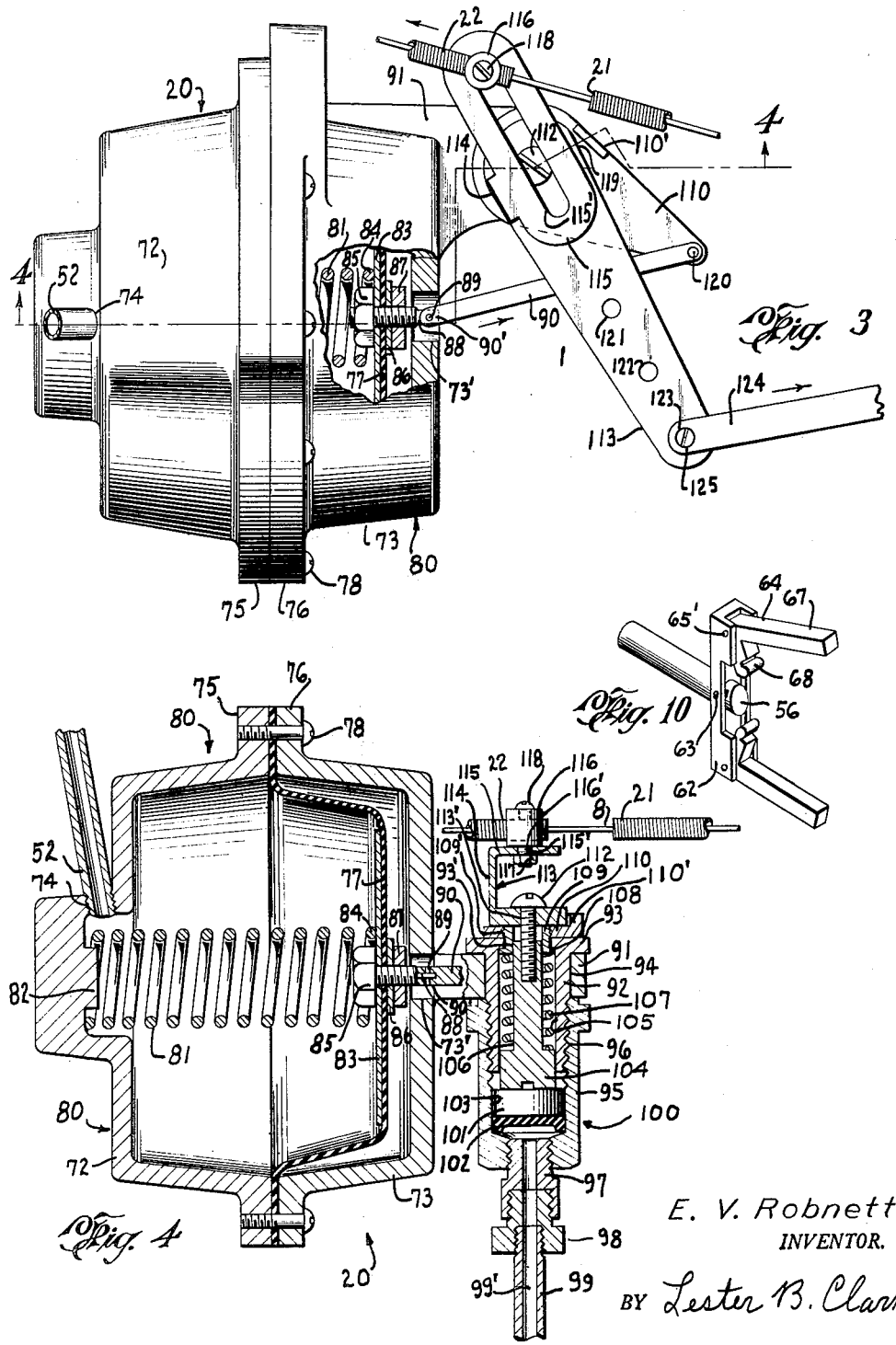
E. V. Robnett, Jr.
INVENTOR.
BY Lester B. Clark
ATTORNEY March 9, 1954  E. V. ROBNETT, JR  2,671,542
SPEED CONTROL MECHANISM FOR ENGINES
Filed March 13, 1951  6 Sheets-Sheet 4
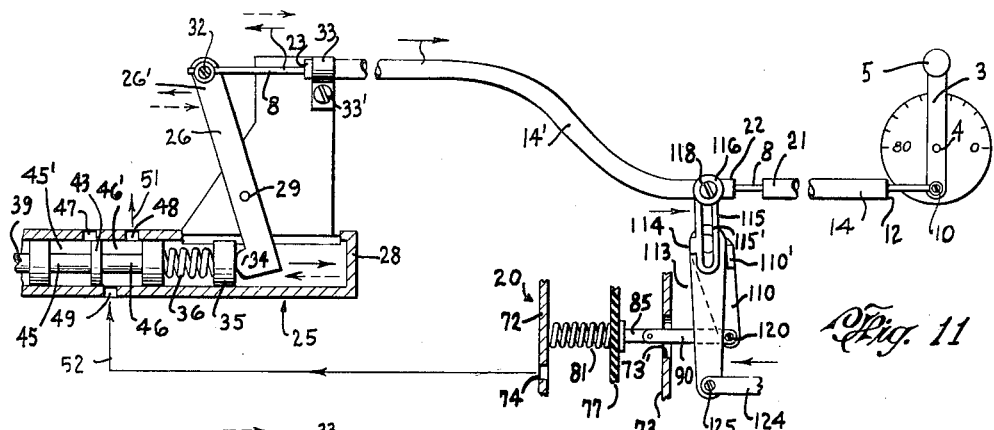
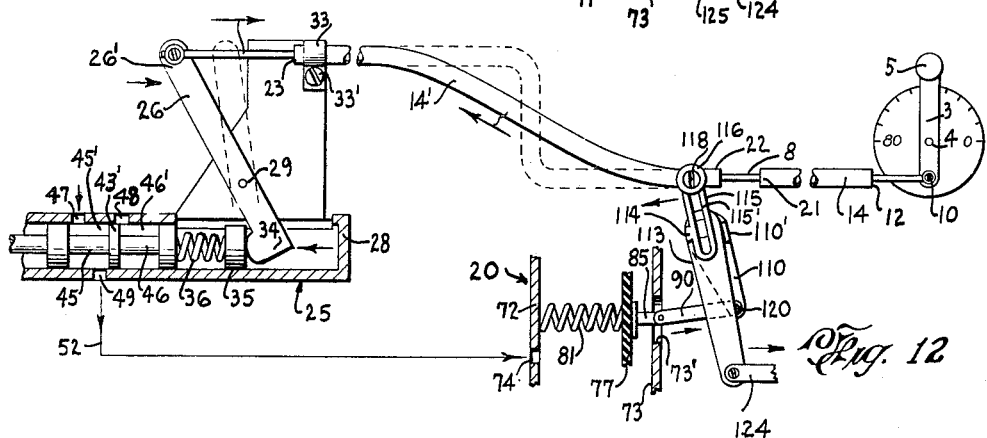
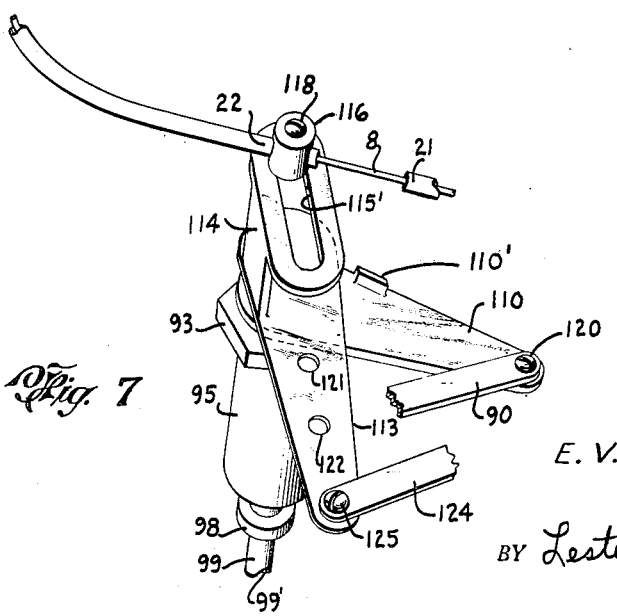
E. V. Robnett, Jr.
INVENTOR.
BY Lester B. Clark
ATTORNEY

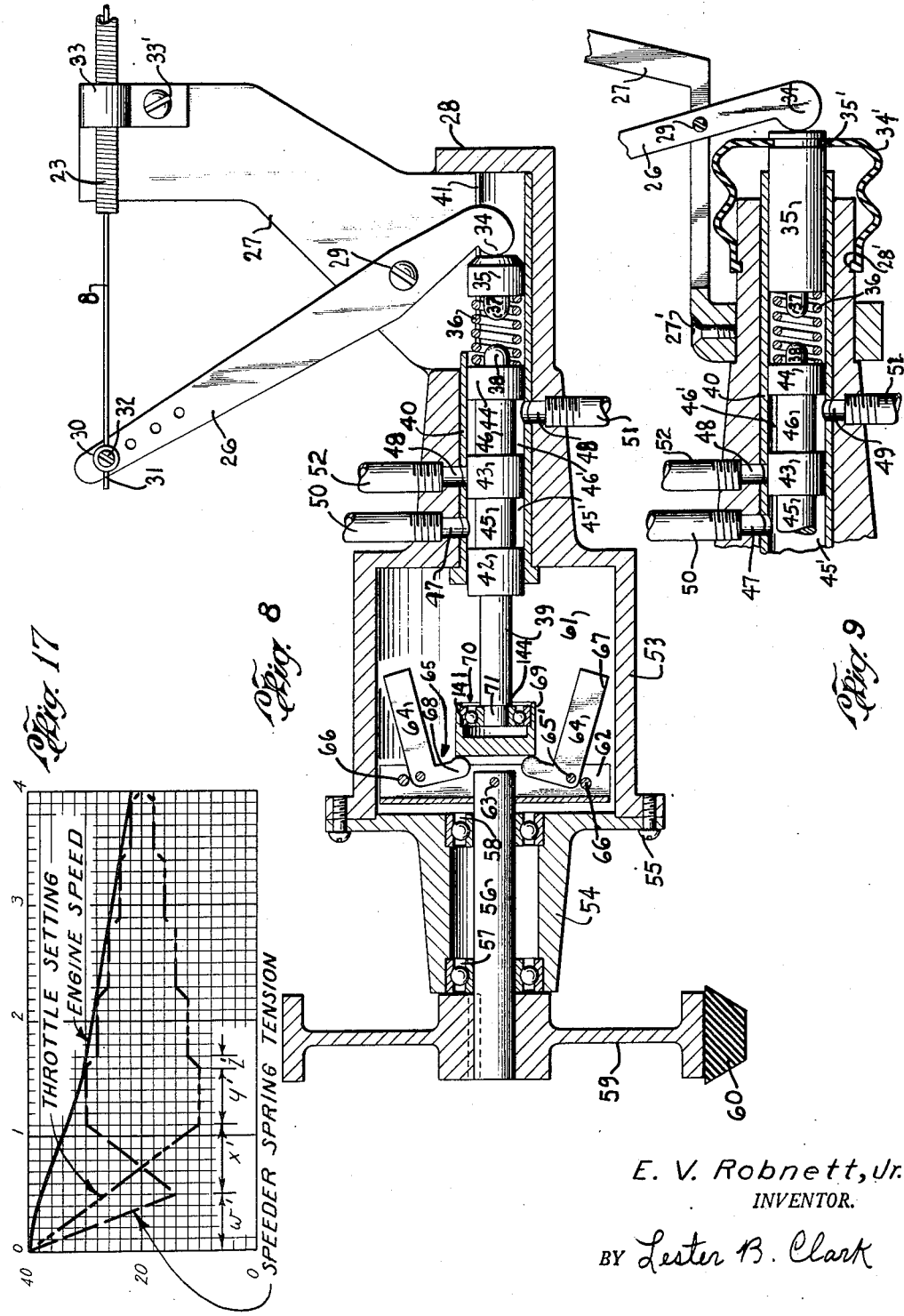

March 9, 1954  E. V. ROBNETT, JR  2,671,542
SPEED CONTROL MECHANISM FOR ENGINES
Filed March 13, 1951  6 Sheets-Sheet 6
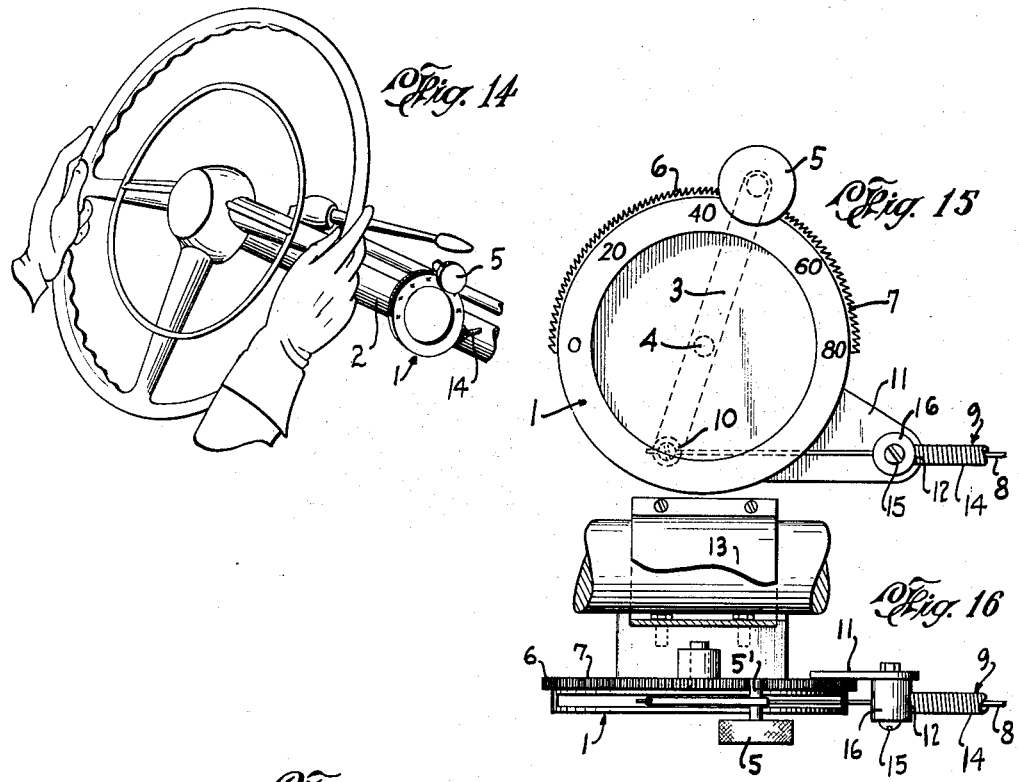
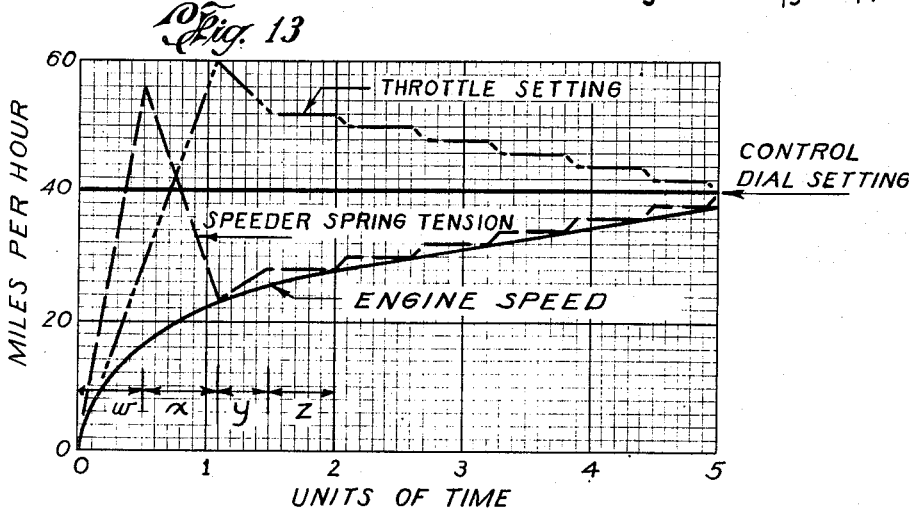
E. V. Robnett, Jr
INVENTOR.
BY Lester B. Clark
ATTORNEY Patented Mar. 9, 1954

2,671,542

UNITED STATES PATENT OFFICE 2,671,542

SPEED CONTROL MECHANISM FOR ENGINES

E. V. Robnett, Jr., Austin, Tex., assignor to Auto Cruz Corporation, Austin, Tex., a corporation of Texas Application March 13, 1951, Serial No. 215,199

7 Claims. (Cl. 192—3)

This invention relates to an improved speed control mechanism, and this application disclosing such invention is a continuation-in-part of my co-pending application for a Speed Governor for Engines, Serial Number 756,732, filed June 24, 1947, now Patent No. 2,556,485.

This invention differs from the invention disclosed in Patent Number 2,283,478 to Arlie D. Warren in that it does not operate in connection with the clutch, and it also differs from the invention shown in Patent Number 2,443,084 to J. W. Rhodes in that it does not consider gear shifts. Additionally it differs from the invention shown in Patent Number 2,260,576 to K. Maybach in which the force, acting oppositely of the governor actuated control shaft or valve, is that of a spring of predetermined characteristics, whereas such force in this invention is a variable force.

Furthermore, this invention differs from Patent Number 2,284,380 to C. S. Drabble, among other respects, in that there is a constantly operating adjustment yieldably opposing tendencies of the vehicle to vary from a predetermined speed. In fact the most distinctive feature of this invention consists in the provision of means which operates responsive to any tendency to change speed from any predetermined speed at which a machine, as a vehicle, may be travelling, and anticipates such change by compensating for such tendency.

This invention particularly relates to an improved control mechanism of the above distinguished type specially adapted to control the speed of vehicles propelled by internal combustion engines, and it further relates to an improved control mechanism of this class which is adapted to maintain the travel of a propelled body at a substantially constant desired speed regardless of condition, as irregular terrain, tending to deviate the body from such desired speed.

It is therefore an object of this invention to provide an improved speed control mechanism of this class adapted to control the propulsion mechanism of a propelled body so that it travels at a substantially constant, desired speed, regardless of variations in forces opposing such constant speed travel.

It is another object of this invention to provide an improved speed control mechanism of this class equipped with means operable responsive to engine developed speeds to compensate for tendencies to change from any predetermined speed at which it may have been desired to travel, by restoring conditions attendant upon travel at such desired speed.

It is still a further object of this invention to provide an improved control mechanism of this class which may employ a conventional vehicle installation, as the brake fluid system, to disengage the control from normal vehicle operation, as when the brake is applied in emergency.

It is yet a further object of this invention to provide an improved control mechanism of this class which may be obviated, as when a speed above a set speed is desired, by the pressing of the standard vehicle accelerator pedal in emergency.

It is also an object of this invention to provide an improved control mechanism of this class which may promptly regain its control of the vehicle speed after having been obviated or disengaged by the emergency operation of standard vehicle installations.

It is also a further object of this invention to provide an improved control mechanism of this class which can be readily installed and calibrated on a wide variety of vehicles of varying construction and performance characteristics.

Other and further objects will be apparent when the specification is considered in connection with the drawings in which:

Fig. 2 is an elevation, partially diagrammatical, showing the assembled elements comprising the invention.

Fig. 3 is a plan view, partially in section, showing the operative or power unit of the invention and elements connected thereto.

Fig. 4 is a sectional elevation through the power unit assembly, taken along line 4—4 of Fig. 3.

Fig. 5 is a plan view, partially in section, showing the power units and elements connected thereto in another phase of operation than that shown in Fig. 3.

Fig. 6 is a sectional elevation through the brake fluid operated disengagement device of the invention.

Fig. 7 is a perspective view of the disengagement device and of the operative arms or levers thereabove.

Fig. 8 is a sectional elevation of the control device of the invention.

Fig. 9 is a fragmentary sectional elevation showing enlarged details of the pilot valve sleeve of the control device and associated elements.

Fig. 10 is a perspective view of the governor of the control device.

Fig. 11 is an elevation, part in section and partially diagrammatic, showing one step in the operation of the control device and power unit.

Fig. 12 is an elevation, part in section and partially diagrammatic, showing another step in the operation of the control device and power unit.

Fig. 13 is a speed-time chart comparing the cyclic operation of the throttle setting and speeder spring tension setting as the vehicle accelerates to a speed indicated by a pre-determined control dial setting.

Fig. 14 is a perspective view showing the control dial mounted on the steering wheel post of an automobile.

Fig. 15 is an elevation of the control dial and its mounting on the steering wheel post.

Fig. 16 is a plan view of the control dial and mounting shown in Fig. 15.

Fig. 17 shows a speed-time chart comparing the cyclic operation of the throttle setting and speeder spring tension setting as the vehicle decelerates from a higher pre-determined speed to a lower speed for which the control dial has been set.

Figure 1:
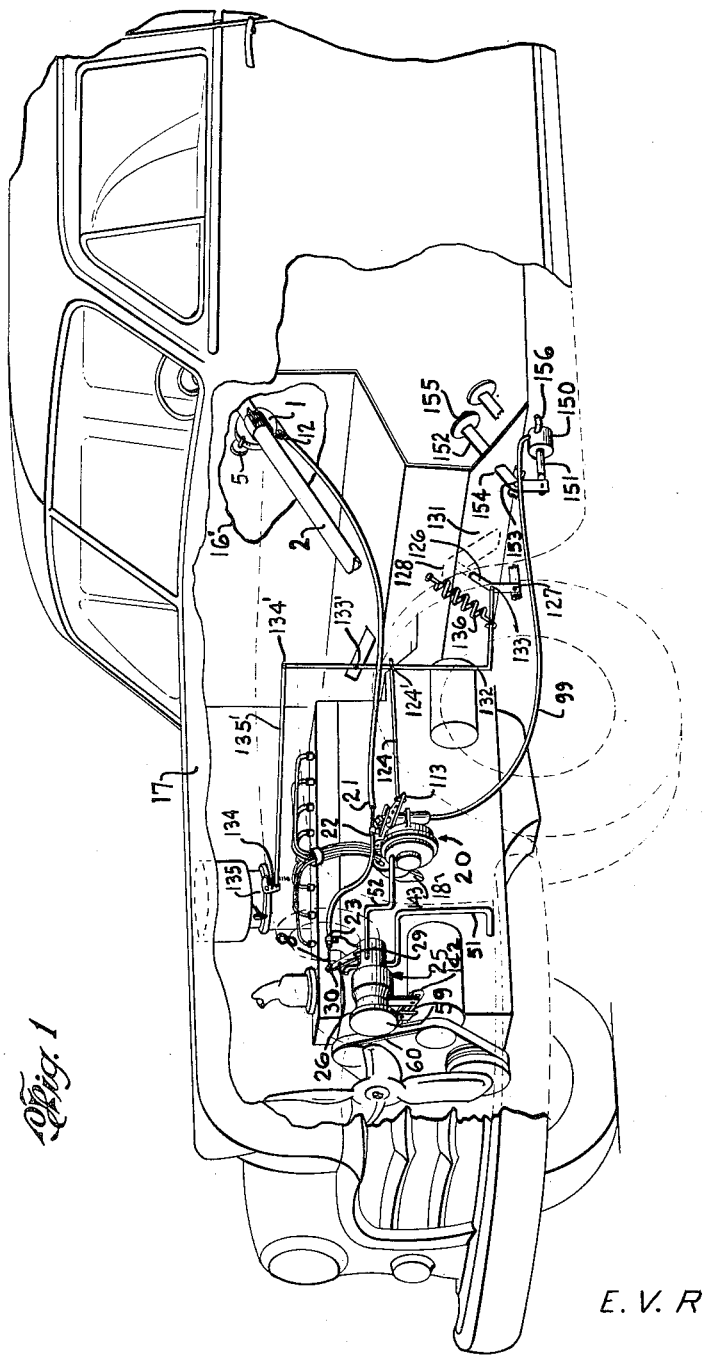
Fig. 1 is a perspective view of the assembled invention installed in an automobile.

Figs. 1, 2, 11, 12, and 14–16, show this invention installed in an automobile. The control dial 1 is mounted on the steering post 2. A lever 3 is pivoted at 4 at the center of the dial so that the pin 5' of the knob 5 may be moved from one tooth 6 to the other on the segment 7 to be set opposite a graduation of the dial corresponding to the speed the driver may desire to travel. The plate 11 extends from the dial 1, and the fitting 16 is fixed thereto, and has the end 12 of the Bowden sheath 14 anchored therein by the set screw 15, while the wire 8 extends on from within the sheath 14 for pivotal connection at 10 to the lever 3. Any suitable flanged clamp 13 may be employed for the connection of the dial 1 to the steering post 2.

The Bowden tube 9 extends through the dashboard 16' and under the hood 17 to a point adjacent an assembly termed the power unit 20 which may be mounted, as on the engine frame 18. At this point the sheath 14 is interrupted, the end 21 thereof is fastened rigidly with respect to the body of power unit 20 by means not shown, while the wire 8 extends on into the sheath end 22, which is rigidly connected to a movable part of the power unit 20.

The Bowden sheath 14 then extends from the power unit 20 and terminates and is anchored at 23 to an element which is rigidly connected, or mounted, to be stationary with regard to the vehicle frame or the housing of the control device 25. The Bowden wire 8 continues through the sheath end 23 and is pivotally connected at 30 to the lever 26, which is pivoted below this connection on the pin 29 which is mounted on the engine frame or control device housing. The lever 26 then extends to contact the terminal operative element of the control unit mechanism.

As shown in enlarged detail in Fig. 8, the bracket 27 is rigidly connected to the control device housing 28, and the lever 26 is pivoted on the pin 29 of the bracket 27. Above the pivot, the lever 26 has the fitting 30 pivotally mounted thereon, and the Bowden wire 8 has the end 31 fixed to the fitting by the set screw 32. To the rear of the lever 26, the Bowden sheath end 23 is rigidly fixed to the bracket 27, as by the clamp 33.

The end 34 of the lever 26 bears against a plunger 35 which in turn presses against a spring 36, termed the speeder spring, for purposes to be hereinafter described. This spring is con- fined around the projection 37 of the plunger 35 and the projection 38 of the valve stem 39. The valve sleeve or body 40 within which the stem 39 operates, is rigidly mounted in the control unit housing 28. The slot 41 is provided in the valve sleeve and housing to permit the operation of the lever 26. The stem 39 has the enlarged portions 42, 43, and 44 thereon slidable in contact with the inner periphery of the sleeve 40, and in between these portions or valve sections the reduced diameter portions 45 and 46 are provided having the annular spaces 45' and 46' therearound. The ports 47, 48, and 49 are provided through the housing and sleeve wall, and the respective connections 50, 51, and 52 thereinto, establish contact respectively with the free air, the intake manifold of the vehicle, and the power unit 20.

A cylindrical housing section or cylinder 53 is provided as part of the housing 28 and this cylinder 53 has a bearing cap 54 connected thereto, as by the screws 55. A shaft 56 extends through the bearing cap 54, and is journalled in the bearing assembly 57, which is recessed into the forward end of the cap, while the bearing assembly 58 is recessed into the rear end of the cap. At its forward end the shaft 56 has keyed thereto the pulley or wheel 59 which has the fan belt 60 mounted thereon so that the pulley 59 revolves responsive to the engine developed speed of the vehicle.

A modified construction is shown in Fig. 9, in which the sleeve 40 extends through the housing 28. The plunger 35 extends from the sleeve 40 and has the annular groove 35' therein to have the bellows shaped jacket 34' fitted therein at one end, while the other end of the jacket 34' fits in the annular groove 28' in the housing 28. The lever end 34 thus presses against both the tension of the jacket 34' and the spring 36. The set screw 27' fixes the bracket 27 to the housing 28.

Within the chamber 61 the governor or governor assembly 65 is mounted on the shaft 56 by means of the pin 63 which connects the governor support frame 62 to the shaft, while the governor flyweights 64 are mounted on the frame 62 by the pins 65'. The stop pins 66 are also provided in the support frame 62 to prevent the flyweight arms 67 from contacting the inner periphery of the cylinder 53, while the flyweight arms 68 bear against the thrust bearing 69 which houses the ball bearing assembly 70 in which is received the end 71 of the shaft 56. The shaft 56, governor support frame 62, and flyweights 64 are shown in detail in the perspective view of Fig. 10, but with the stop pins 66 omitted for clarity.

As shown most clearly in Figs. 3–7, the connection 52 from the control unit 25 connects at 74 into the power unit 20. This unit includes two housing members 72 and 73 which have the flanges 75 and 76 thereon, so that the diaphragm 77 may be held thereinbetween, and so that the two members 72 and 73 may be connected by the cap screws 78 to complete the housing 80.

The spring 81 bears at one end around the boss 82 of the housing member 72, and at the other end the spring bears against a diaphragm 77. Optionally, the plate 83 may be provided as a bearing for the spring end 84. The cap screw 85 extends through the plate 83 and diaphragm 77, the washer 86, and nut 87, and has the flange plate 88 thereon. The diaphragm link 90 extends into the opening 73' and has the forked end 90' which fits on the flange plate 88 while the pin 89 pivotally affixes the link 90 to the flange plate 88. The housing member 73 has rigidly connected thereto the bracket 91. The bushing 92 having the flange 93 thereon, is inserted through the bore 94 of the bracket 91. The coupling 95 is threaded at 96 onto the bushing 92 so that the bracket 91, bushing 92, and coupling 95, together constitute the housing assembly 100.

The fitting 97 is threaded into the base of the coupling 95 and the adapter 98 is threaded in turn into the fitting 97, so as to connect the flow passage 99' passing in turn through the line 99, the adapter 98, and the fitting 97, with the bore 103 of the housing assembly 100.

The flexible cup 102 is slidable in the bore 103 and bears against the piston or button plunger 101 which is also slidable within the bore 103. The button 101 bears against the plunger head 104 which is slidable within the bore 105 of the bushing 92.

The connector 109 has the head 108 which can be slid through the bore 105 to shoulder against the inner side of the bushing flange 93 while the body of the connector 109 extends through the bore 93' of the flange 93 to have the lower lever 110 threaded thereon at 109'.

The screw 112 is threaded and extends through the upper lever 113 at 113' and threads into the plunger body 106, which is slidable within the connector bore 93' and fastens the upper lever 113 to the plunger 106.

The lever 113 has the upstanding portion 114 and the top portion 115 which has the slot 115' therein. The fitting 116, which includes the threaded projection 116', is positioned on the portion 115 by inserting the projection 116' through the slot 115' and tightening the nut 117 on the threaded projection. The set screw 118 is threaded into the fitting 116 to bear against, and anchor the Bowden sheath end 22 to the top lever 113.

The lower lever 110 has thereon the projection or lug 110' which is shown in Fig. 5 in contact with the upper lever edge surface at 119, and as the diaphragm link 90 is pivotally connected at 120 to the lower lever, there is a driving connection between diaphragm and upper lever, as will be hereinafter explained.

The top lever 113 has the holes 121, 122, and 123, into one of which the linkage 124 is connected as by the pivot pin 125. This linkage 124 is pivotally connected at 124', as indicated in Figs. 1 and 2, to the angular linkage 132 which is pivotally connected at 133 to the accelerator lever 126. This lever, in turn, is pivoted at 127 from the frame of the vehicle, to operate through the slot 127' in the floor-board 131, and such lever has the foot feed or accelerator pedal 128 rigidly connected thereto at 129. The pedal 128, in turn, is connected to the hinge 130 on the floor-board 131 of the vehicle. Above the connection 124' the angular linkage 132 is pivotally connected at 133' to the vehicle frame, and thereabove at 134' to the rod 135' which operates the butterfly valve or throttle valve 134 of the carburetor 135. The spring 136 is shown connected to the rod 132 and to the floor-board 131 to urge the throttle valve 134 to closed position.

In view of the contact between lug 110' and surface 119, as shown in Fig. 5, the lower lever 110, which has the diaphragm link 90 pivotally connected thereto at 120, will draw the upper lever with it in clockwise rotation as the diaphragm 77, to which the link 90 is pivotally connected, moves to the left responsive to manifold suction. The top lever 113 is likewise drawn in a clockwise direction, and pulls linkage 124 to the left to open the butterfly valve 134.

Conversely, as shown in Figs. 3 and 4, it can be seen that when the manifold suction is much less than the force of spring 81, so that the diaphragm 77 is urged farther to the right than the resulting rightward movement of the linkage 124 responsive to the urging of the spring 136, there can result a disengagement of contact between the upper lever edge 119 and the lower lever lug 110'.

In regard to the linkages 124, 132, and 135', which interconnect the power unit 20, accelerator lever 126, and the butterfly valve 134, it can be stated that other linkages may serve as well, and are included in this invention, as many conventional structures will obtain the same desired results.

As shown in Fig. 1, the brake cylinder 150 has the piston rod 151 extending therefrom for loosely pivotal connection to the brake pedal lever 152, which is pivoted at 153 to the vehicle frame, and which operates through the slot 154 in the floor-board 131, and which has the brake pedal 155 on the end thereof within the vehicle. The line 156 leads from a point in the cylinder 150 to the rear of the piston, not shown, to convey fluid to operate the brakes. The line or connection 99 also leads from a point in cylinder 150 to the rear of the piston, to the adapter 98. Thus the exertion of pressure on the brake pedal 155 forces fluid from the cylinder 150 both to operate the brakes and to pass through flow passage 99' into the bore 103 below the cup 102.

The fluid which thus passes through flow passages 99' exerts pressure below the cup 102 and forces the piston or button plunger 101 upwardly against the plunger head 104 to compress the spring 107 and lift the top lever 113 above the lug 110', as shown in Fig. 6. This interrupts the lost-motion connection between the manifold suction actuated member or diaphragm 77 and the throttle valve 134.

Thus the spring 136 may draw the linkage 124 toward the rear of the vehicle at one rate of speed, thereby tending to close the throttle valve, while at the same time the diminishing of manifold suction operative against the diaphragm 77 may permit the spring 81 to force the diaphragm 77, and the connected linkage 90, lever 110, and included lug 110', to the rear at a faster rate of speed.

Such braking is only necessary in emergencies and the conditions under which this invention primarily seeks to operate are restored when the pressure on the brake pedal is removed, thereby permitting the spring 107 to force the plunger head 104 downward, thereby returning brake fluid from the line 99 back into the brake cylinder 150.

Whenever it is desired to speed the vehicle above the desired regulated speed, it is only necessary to step on the accelerator pedal 128 to pivot the linkage 132 to open the throttle valve 134. The resulting leftward or forward movement of the linkage 124 will urge the top lever 113 in a clockwise direction, as shown in Fig. 7, and out of contact with the lug 110'.

The specific operation of the anticipator feature of this invention may be most readily understood when Figs. 11 and 12 are considered in connection with Figs. 13 and 17. Let us assume that the invention has been calibrated with relation to the vehicle on which installed, as will be hereinafter described, and that a controlled or regulated speed of 40 miles per hour is represented by the positions of the lever 3 shown in Figs. 11 and 12. Let us further suppose that the setting of the lever 3 has been advanced to 40 miles per hour from a much lower, or idling speed.

The movement of the lever knob 5 in a counter-clockwise direction results in the Bowden wire 8 being pulled to the right, as shown in Fig. 11 by the dotted arrows, and this moves the lever end or abutment 34 against the plunger 35 to increase the tension of the speeder spring 36 and to move the pilot valve or stem 39 to the left, thereby placing the annular space 46' around the reduced diameter portion or valve section 46 in communication with the port 48 to the intake manifold of the vehicle and the port 49 to the power unit 20.

At this point in the description it should now be noted that the full line arrows in Fig. 11 will indicate the direction of movement of the lever end 34, lever end 26, Bowden wire 8, Bowden sheath 14', top lever 113, and linkage 124, as will be explained immediately hereinbelow.

The suction of the intake manifold draws air through the opening 74 in the housing section 72, and this suction draws the diaphragm 77 to the left and compresses the spring 81, as air is withdrawn from the housing section 72. As the diaphragm 77 moves to the left, it draws with it the link 90 and lower lever 110, and the contact of the lug 110' with the edge surface 119 of the top lever 113 also draws this lever with it in clockwise rotation, moving the linkage 124 to the left and opening the throttle valve 134, as hereinabove explained.

However, since the Bowden sheath 14 has its end 22 fixed to the top lever 113 by the set screw 118, and also has its end 23 fixed to the bracket 27 by the clamp 33, the clockwise rotation of the top lever 113 carries with it rightwardly, as viewed in Fig. 11, the sheath end 22. Such movement reduces the distance between sheath ends 21 and 22, thereby reducing the over-all sheath distance from the end 12 to end 23. This movement is possible and understandable if Fig. 12 is considered since it can be seen that when the top lever 113 is further in counter-clockwise rotation than shown in this figure, the sheath end 22 is further to the left, and the sheath 14' can have the slack therein indicated by the dotted line configuration.

It follows and can be noticed that the after end of the wire is maintained in a fixed position, since it is fixed at 10 to the end of the lever 3, and since the lever 3 is set at the desired speed setting of 40 miles per hour by means on the dial 1, as hereinabove described. Also since the length of the wire 8 is not affected by the shortening of the sheath 14 and 14', it is now relatively longer than the sheath and its ends must extend farther beyond the sheath ends at 12 and 23.

Now, since the after end of the wire 8 is fixed at 10, the forward end of the wire 8 must extend beyond the sheath end 23, its original distance plus an additional distance equal to the shortening of the over-all length of the sheath. It can also be noticed that the forward end of the wire 8 is connected to the lever 26, which is pivoted at 29 on the bracket 27. The wire 8 thus can only move to the left, as shown in Fig. 11, when the Bowden sheath 14' straightens and moves to the right. The leftward movement of the wire 8 pivots the lever 26 to move the end 34 to the right or counter-clockwise to lessen the tension of the speeder spring 36.

The rightward movement of the sheath end 22, and the lever movement of the wire 8 with relation to the fixed sheath end 23 continues until the pilot valve or stem 39, moving rightward as the speeder spring tension is relaxed, and as the governor 65 forces the stem 39 as the engine builds up speed, and this places the air port 47 and port 49 to the power unit in communication by way of the annular space 45' about the reduced diameter portion or valve section 45. This admits air into the power unit housing section 72 to relieve the vacuum therein, thereby permitting the spring 81 to force the diaphragm 77 to the right, as shown in Fig. 12.

As the diaphragm 77 moves to the right, the spring 136, fixed to the floor board 131, may draw the linkage 124 to the right or rearward to close the throttle valve 134. The resulting counter-clockwise rotation of the top lever 113, since it is connected to linkage 124, results in a leftward movement of the sheath end 22, since it is fixed to the lever 113. This increases the distance between sheath ends 21 and 22 thus increasing the over-all length of the sheath 14 and 14'. This lengthening of the sheath causes the wire 8 to become relatively shorter and results in drawing the lever end 26' in clockwise rotation as the wire 8 moves rightwardly. This moves the lever end or abutment 34 against the plunger 35 to increase the tension of the speeder spring 36. As regards direction, the arrows in Fig. 12 will not indicate the direction of movement of the lever end 34, lever end 26', Bowden wire 8, sheath 14', top lever 113, and linkage 124, will be as described immediately hereinbelow.

Fig. 13 represents graphically the steps transpiring in bringing a vehicle up to a pre-determined speed at which it is desired to regulate vehicle travel. The abscissa distance represents the time required to manually set the knob 5 and lever 3 to a higher setting, as 40 miles per hour while actually a speeder spring tension is attained thereby, as an ordinate representation of 56 miles per hour, and in excess of the tension at which it will finally balance at the desired speed. The quick action of manifold suction on the diaphragm 77, when this action places ports 48 and 49 in communication, rapidly draws the throttle valve 134 to substantially full throttle position, represented as 60 miles per hour, the time required to attain this full throttle being represented by the abscissa distances $w+x$. During this period the actual engine speed, which, owing to the inertia of the vehicle, cannot respond in conformity with the speed indicated by the throttle setting, rises to the ordinate representation of 23 miles per hour.

As engine speed increases, the fly-weights 64 move outwardly, and the ends 67 thereof bear against the bearing housing 69. As the housing 69 has the shoulder 141 therein, and the ball bearing unit 70 fits against the shoulder, and around the turned down end 71 of the pilot valve or stem 39, and against the stem shoulder 144, the increased rotation of the pulley 59, responsive to increased engine speed, is translated through the governor 65 into an increased thrust against the pilot valve 39 and speeder spring 36. This increased rightward thrust works to move the valve section 43 over the port 49 to cut off the operation of manifold suction against the diaphragm.

Although the tension of the speeder spring 36 would be increased by the thrust of the governor against the pilot valve, such tension actually diminishes during the time interval $x$, after the lever 3 has been set, as shown in Fig. 13. Such diminution is attributed to the leftward movement of the Bowden wire 8 responsive to the rightward movement of the Bowden sheath end 22 as the suction up the diaphragm 77 results in the clockwise rotation of the top lever 113, as shown in Fig. 11.

The governor pressure on the pilot valve 39 and the rightward movement of the Bowden sheath end 22, move the pilot valve 39 rightwardly, and the valve section 43 first occludes the port 49 to cut off the operation of manifold suction on the diaphragm 77, and then further rightward movement, as urged by governor thrust, places the ports 47 and 49 in communication to break the vacuum in the housing section 72. This occurrence is indicated at abscissa point 1.1 in Fig. 13, the point in time when speeder spring tension corresponds with engine speed.

The breaking of the vacuum permits the spring 81 to force the diaphragm 77 rightwardly, and the lever 113 is pivoted in a counter-clockwise direction as hereinabove described and shown in Fig. 12. This results in the leftward movement of the Bowden sheath end 22 and the action of the lever 26 to compress the speeder spring. At the same time the throttle is moved toward closed position. The time interval $y$ in Fig. 13 represents the period of these occurrences.

Now the compression of the speeder spring moves the pilot valve 39 to the left to occlude the port 49. The speeder spring tension and throttle setting must then remain constant during the time interval $z$ until governor speed builds up to push the pilot valve 39 to the right to admit air to the diaphragm. Then there follows a resulting increase of speeder spring tension and drop of throttle setting as hereinabove described.

As shown in Fig. 13, this cycle is repeated, each time with a lesser increase in speeder spring tension and a lesser drop in throttle setting, until the desired speed is approached in decreasing increments of time. In this regard, it is pointed out that, in view of the speed and performance characteristics of the vehicle on which this invention may be employed, the step-by-step adjustment to a desired speed takes place in a relatively inconsequential time, and after a very inappreciable distance of travel as compared to the extent of time and distance at which it may be desired to regulate the vehicle at a desired speed.

As shown in Fig. 17, a reduction of the indicated speed to say 20 miles per hour, as could be obtained by a clockwise movement of the lever 3 shown in Figs. 11 and 12, will result in a drop in speeder spring tension during the time interval $w'$ required to manually move the setting. After this the speeder spring tension builds up when the lever 113 is rotated counter-clockwise, as shown in Fig. 12, as a result of the action of the spring 136 upon the lever 113 through the linkages 132 and 124. While this occurs the throttle setting decreases as the throttle valve 134 is consequently closed by such motion. This closing continues until the valve section 43 occludes the port 49; the time interval $w'+x'$ in Fig. 17 representing the throttle action during this period. It should also be noticed that the end of the interval $x'$ finds the speeder spring increased to a setting above the desired speed and below the original speed.

Then, when the port 49 is occluded during the interval $y'$, while the engine speed decreases responsive to the closing of the throttle valve, the diminishing of thrust by the governor permits the pilot valve to be urged farther to the left by the speeder spring 36, and this opens communication between the ports 48 and 49 so that vacuum may draw the diaphragm 77 to the left, as shown in Fig. 11. This results in an increased throttle setting and a corresponding decrease in speeder spring tension during the interval $z'$, until the port 49 is again occluded. This cycle continues, as shown in Fig. 17, until the engine speed corresponds to the setting of the dial 1.

When a desired speed is attained as shown in Figs. 13 and 17, the vehicle tends to remain at such speed regardless of terrain traversed. Should the vehicle start down hill, the increased engine speed will result in the governor moving the pilot valve to the right, as shown in Fig. 11, until the vacuum line to the diaphragm is interrupted and the rightward movement of the diaphragm 77 results in a reduced throttle. Conversely, when the vehicle starts uphill, the decreased governor thrust will permit the pilot valve to move to the left, as shown in Fig. 11, to open vacuum communication and increase the throttle.

The device may be calibrated, as shown in Fig. 2, by leaving the set screw 33' loose in the clamp 33; and with the lever 3 in a set position on the dial 1, the vehicle may be driven on level ground at an indicated speedometer speed which is to correspond with the setting of the lever. Then, while the vehicle holds the pre-determined speed, the set screw 33' may be tightened, thereby fixing the Bowden sheath distance between clamp 33 and fitting 116. With this one speed determined, the dial face 1 may be marked, if desired, with the observed speeds corresponding with various teeth 6. An optional dial construction may consider a periphery of radially spaced indentations around a dial and a corresponding lug on the lever 3 to fit into the indentations. Other well known forms of dials are also within the contemplation of this invention.

This invention also is subject to alterations of arrangement of the relationship between the various elements. For instance the power unit 20 may be reversed 180° in direction, as shown in plan view, and by slightly modifying lengths of levers 110 and 113, and position of vertical axis of the brake fluid actuated disengagement device or assembly, the top lever 113 may be connected at 123 to the outer end of the rod 90, while the bottom lever 110 is connected at 120 to the linkage 124 by the pin 125. In such case the end 23 of the Bowden sheath 14' is fixed by the set screw 15 in the fitting 16 on the dial bracket 11, while the end 22 of the Bowden sheath 14' is fixed in the fitting 116 on the top lever 113. Thus the Bowden sheath section between the dial and the movable top lever 113 is the section which causes relative movement between sheath and wire 8. This arrangement permits an easier calibration of the device, since the Bowden sheath end 23 may be anchored by the driver himself simply setting up on the set screw 15 with one hand while he drives with the other hand along a level stretch of road at the desired speed.

In further regard to details of construction, the Bowden sheath section 14 shown in the drawings extending from the dial at one end to an end 21 adjacent the power unit, and fixed with relation thereto by means not shown, serves as a sheath or guide only for the Bowden wire. This also would apply for the element corresponding in function to the Bowden sheath section 14 in the altered arrangement described immediately hereinabove but not shown in the drawings, as such section would only serve as a guide sheath from a point adjacent the power unit to the bracket 27.

Also the lost-motion construction between lever 113 and lever 110 may be subject to a variety of arrangements, as for instance, providing a lug 110' on each lever to engage a lug on the other lever when such engagement is desired.

In the arrangement of levers 113 and 110, and of the Bowden sheath 14' immediately hereinabove described, the theory of operation is the same as for the arrangement shown in the drawings. However, to describe such an obvious operation, the lefts, rights, forwards, rears, clockwise and counter-clockwise rotations, and other directional designations will have to be reversed in description, as the construction dictates.

A further choice in construction is herein pointed out and claimed in that the housing section 73 is not essential to the operation of the power unit 20 if a conventional holddown ring is substituted for its flange 76. In such case the diaphragm 77 would be exposed on the side thereof connected to the link 98, but nevertheless such construction would be operative and is included as part of this invention.

It is readily noticeable and obvious that this invention may be installed and calibrated on a wide range of vehicles varying in construction and performance characteristics. The adaptations can be made as by altering the length of line 51 from intake manifold to control unit, the design of the control unit mounting bracket 142, and the design of the power unit mounting bracket 143; also the length of the line 99 from brake fluid cylinder to power unit, as shown in Fig. 1.

It is herein pointed out that whereas the drawings show intake manifold suction admitted by the control valve to actuate the diaphragm, any engine developed force may be employed as well, as the lubricating system pressure fluid disclosed in my co-pending application Serial Number 756,732, filed June 24, 1947, now Patent No. 2,556,485, in which case the fluid actuates a piston instead of a diaphragm. With such structure the piston may be connected by linkage means to either one of the levers 110 or 113, the other lever of these two being connected by linkage means to the throttle valve.

Obviously, the salient feature of this invention resides in the fact that, since the diaphragm responds to manifold suction much more quickly than it takes the engine speed to accelerate responsively, it is necessary to provide a control, supplementary to the control included in my co-pending application, Serial Number 756,732, filed June 24, 1947, now Patent No. 2,556,485, which supplementary control makes speeder spring tension not only a function of engine speed and of dial setting speed, but also a function of the throttle setting. The arrangement whereby the Bowden sheath 14' moves responsive to diaphragm position, and moves the wire 8 therein to regulate speeder spring tension, is the essence of this supplementary control supplied by this invention.

Broadly this invention considers an improved control mechanism which compensates for the difference between the rapid control reaction responsive to an engine developed force thereon, and the slower control reaction responsive to the developed speed of the engine driven vehicle as affected by friction, inertia, and gravity.

What is claimed is:

1. In a mechanism for controlling the speed of a vehicle propelled by an internal combustion engine and provided with a brake system including a brake pedal, the combination of, a housing, an actuated member therein extending thereacross, linkage means operatively connecting said actuated member to the throttle valve of said engine, means adapting said engine to create a pressure differential between the opposite sides of said actuated member within said housing, means controlling the application of said pressure differential, means adjusting said control means in response to engine speed, said linkage means including, a pair of concentric shafts, a lever on one of said shafts connected to said throttle valve, a lever on the other of said shafts connected to said actuated member, and lug means on at least one of said interconnected shafts and levers engageable with the other of said interconnected shafts and levers for establishing a lost motion driving engagement therebetween, one of said shafts being movable axially of the other of said shafts to selectively disengage said lug means to interrupt said driving engagement, and means for moving said axially movable shaft in synchronism with movement of the brake pedal of said vehicle, said adjusting means including, governor means operable directly responsive to increased engine speed to urge said control means in one direction, and means for selecting pre-determined vehicle speeds and for urging said control means in the opposite direction while set at any pre-determined speed, said selecting means being connected to said linkage means and operable responsive to the increased opening of the throttle valve to diminish the urging of the selecting means in said opposite direction.

2. In a mechanism for controlling the speed of a vehicle propelled by an internal combustion engine and provided with a brake system including a brake pedal, the combination of, a housing, an actuated member therein extending thereacross, linkage means operatively connecting said actuated member to a throttle valve of said engine, means adapting said engine to create a pressure differential between the opposite sides of said actuated member within said housing, means controlling the application of said pressure differential, means adjusting said control means in response to engine speed, said linkage means including, a pair of concentric shafts, a lever on one of said shafts connected to said throttle valve, a lever on the other of said shafts connected to said actuated member, and lug means on at least one of said interconnected shafts and levers engageable with the other of said interconnected shafts and levers for establishing a lost motion driving engagement therebetween, one of said shafts being movable axially of the other of said shafts to selectively disengage said lug means to interrupt said driving engagement, and means for moving said axially movable shaft in synchronism with movement of the brake pedal of said vehicle, said adjusting means including, governor means operable directly responsive to increased engine speed to urge said control means in one direction to relieve the application of said pressure differential, and means for selecting pre-determined vehicle speeds and for urging said control means in the opposite direction while set at any pre-determined speed to admit the application of said pressure differential, said selecting means being connected to said linkage means and operable responsive to the increased opening of the throttle valve to diminish the urging of the selecting means in said opposite direction.

3. In a mechanism for controlling the speed of a vehicle propelled by an internal combustion engine having a throttle valve, the combination of a housing, an actuated member therein extending thereacross, linkage means operatively connecting said actuated member to the throttle valve of said engine, means adapting said engine to create a pressure differential between the opposite sides of said actuated member within said housing, means controlling the application of said pressure differential, means adjusting said control means in response to engine speed, and means normally included in said linkage means but operative responsive to pressure on the brake pedal of said vehicle to disengage the operative connection between said actuated member and said throttle valve, said adjusting means including, governor means operable directly responsive to increased engine speed to urge said control means in one direction, and means for selecting predetermined vehicle speeds and for urging said control means in the opposite direction while set at any predetermined speed, said selecting means being connected to said linkage means and operable responsive to the increased opening of the throttle valve to diminish the urging of the selecting means in said opposite direction.

4. In a mechanism for controlling the speed of a vehicle propelled by an internal combustion engine having a throttle valve, the combination of, a housing, an actuated member therein extending thereacross, linkage means operatively connecting said actuated member to the throttle valve of said engine, means adapting said engine to create a pressure differential between the opposite sides of said actuated member within said housing, means controlling the application of said pressure differential, means adjusting said control means in response to engine speed, and means normally included in said linkage means but operative responsive to pressure on the brake pedal of said vehicle to disengage the operative connection between said actuated member and said throttle valve, said adjusting means including, governor means operable directly responsive to increased engine speed to urge said control means in one direction to relieve the application of said pressure differential, and means for selecting predetermined vehicle speeds and for urging said control means in the opposite direction while set at any predetermined speed to admit the application of said pressure differential, said selecting means being connected to said linkage means and operable responsive to the increased opening of the throttle valve to diminish the urging of the selecting means in said opposite direction.

5. With an internal combustion engine propelled vehicle having thereon an actuated member and an engine throttle valve, means adapted to apply an engine developed force to said actuated member, linkage means operatively connecting said actuated member to the throttle valve of said engine, and means controlling the application of said force, the combination of, a governor operable directly responsive to increased engine speed to urge said control means in one direction, and means for selecting pre-determined vehicle speeds and for urging said control means in the opposite direction while set at any pre-determined speed, said selecting means being connected to said linkage means and operable responsive to the increased opening of the throttle valve to diminish the urging of the selecting means in said opposite direction.

6. With an internal combustion engine propelled vehicle having thereon an actuated member and an engine throttle valve, means adapted to apply an engine developed force to said actuated member, linkage means operatively connecting said actuated member to the throttle valve of said engine, and means controlling the application of said force, the combination of, a governor operable directly responsive to increased engine speed to urge said control means in one direction to relieve the application of said force, and means for selecting pre-determined vehicle speed and for urging said control means in the opposite direction while set at any pre-determined speed to admit the application of said force, said selecting means being connected to said linkage means and operable responsive to the increased opening of the throttle valve to diminish the urging of the selecting means in said opposite direction.

7. An engine speed control including an engine fuel feed valve, a motor actuator therefor, a conduit supplying motivating force to said actuator, means controlling the flow of motivating force by said conduit, engine speed responsive mechanism for operating said control means, means exerting a force in opposition to said speed responsive device, and a motion transmitting connection for transmitting motion from said actuator to the last mentioned means to vary the force exerted thereby.

E. V. ROBNETT, Jr.

References Cited in the file of this patent

UNITED STATES PATENTS

| Number | Name | Date |
| --- | --- | --- |
| 1,810,128 | Chapel | June 16, 1931 |
| 2,014,854 | Lothrop | Sept. 17, 1935 |
| 2,021,832 | Callihan | Nov. 19, 1935 |
| 2,167,110 | Gutenberg | July 25, 1939 |
| 2,238,838 | Warren | Apr. 15, 1941 |
| 2,283,478 | Warren | May 19, 1942 |
| 2,529,437 | Weinberger | Nov. 7, 1950 |
| 2,556,485 | Robnett | June 12, 1951 |